April 13, 1943.　　　G. L. BENSON　　　2,316,549
PNEUMATIC TIRE ASSEMBLY
Filed July 29, 1941
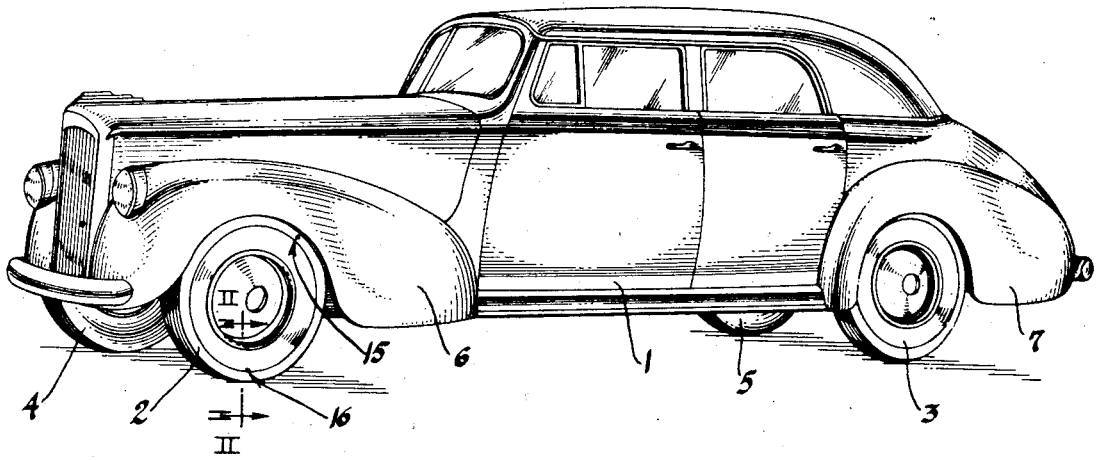
Fig. 1
Fig. 2
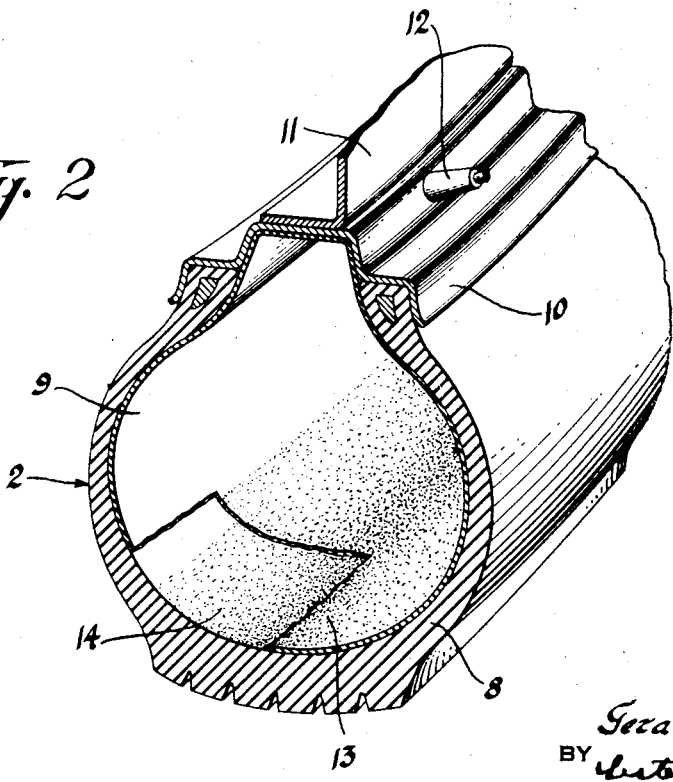
INVENTOR
Gerald L. Benson
BY
ATTORNEY Patented Apr. 13, 1943

2,316,549

UNITED STATES PATENT OFFICE 2,316,549

PNEUMATIC TIRE ASSEMBLY

Gerald L. Benson, Detroit, Mich., assignor to United States Rubber Company, New York, N. Y., a corporation of New Jersey Application July 29, 1941, Serial No. 404,494

4 Claims. (Cl. 152—330)

This invention relates to the control of static in tire assemblies, and in particular it relates to the combination with an automotive vehicle of pneumatic tire assemblies in which the tires and/or tubes are treated so as to prevent the generation of and/or facilitate the dissipation of electrostatic charges. More particularly the invention relates to the treatment of the interior of an inner tube particularly the crown portion, or the treatment of the interior of a tire carcass with a finely divided electrically conducting powder, and to the method involving such treatment.

In the operation of automotive vehicles, the insulating characteristics of pneumatic tires in combination with road surfaces over which the tire is moved, causes the generation of static electricity with the result that a static charge accumulates on the tires or vehicles until the accumulated voltage results in spontaneous discharges. These discharges are particularly objectionable in connection with automobile radio reception.

In the absence of means for reducing the generation of static in automotive vehicles, tests have indicated that the surface of a rolling tire, when in contact with a road surface, is charged negatively leaving an equal and opposite positive charge on the road. The voltage between the surface rubber in the contact area and the road surface may be only a fraction of a volt, but the voltage may increase to several thousand volts after the contact is broken. The tire and road act as condenser plates for which the voltage is roughly proportional to the distance between the tire and road surface which may be only a few millionths of an inch. This means that when the contact is broken the voltage will go up many fold unless the tread is sufficiently conducting so that the charges can return to the contact area. The charge on the surface of the tire may escape by flowing to the hub of the wheel, it may discharge through the air to the fender of the car, or it may discharge to the ground or air. The relative amounts of such discharges depend upon the resistance of the tire and the voltage built up on the surface of the tire. If the tire and tube have high electrical resistance, most of the charge will be discharged through the air to the fender or ground producing what is known as a corona discharge.

If the tread region of a tire is sufficiently conducting, the static charges will flow through the conducting tread towards the contacting area thereby preventing high potentials from building up at any point on the tread surface. The low tread resistance keeps the difference in potential between the tread surface and the road surface low, while a high sidewall resistance increases the resistance between the tread surface and the car, thereby reducing the flow of static charges to the car. For this reason experiments have indicated that sidewall resistance should be in excess of 1,000,000 ohms.

I have found that static electricity as it affects an automotive vehicle can be controlled by coating the inner surface or crown portion at the inside of the inner tube with a film of an electrically conducting powder such as carbon black or finely divided metallic particles. When the electrically conducting material is used within the inner tube, it may be applied during the manufacture of the tube or it may be inserted through the valve stem of a deflated tube without dismounting the tire assembly. This conducting material may also be applied on the outer crown surface of the inner tube or its complementary inner crown surface of the tire casing. When the electrically conducting powder is applied between the inner tube and the tire casing, it is necessary to apply this material before the inner tube is assembled with the tire casing.

Among the advantages of my invention are to reduce substantially automobile radio interference resulting from static discharges from automotive vehicles; to permit quiet and improved quality in automotive radio reception; to eliminate or reduce static shock; to reduce cracking in inner tubes due to ozone created by static discharges occurring between the tire casing and the inner tube; and, to provide a method of reducing static difficulties which can be applied by the automotive vehicle operator easily and efficiently. These and other objects and advantages will appear more fully in the following detailed description when considered in connection with the accompanying drawing in which:

Fig. 1 is a side elevational view of an automotive vehicle including pneumatic tire assemblies embodying my invention; and, Fig. 2 is a perspective view in section of a portion of a tire and wheel assembly illustrating the location of the treated surfaces of the tire and/or tube, the section being taken along lines II—II of Fig. 1.

With reference to the drawing and in particular to Fig. 1, I show an application of my invention in the form of an automotive vehicle 1, supported by pneumatic tire wheel assemblies 2, 3, 4 and 5. Partially enclosing the tire assemblies are front and rear fenders 6 and 7 respectively. The wheel assembly 2, which is similar to each of the wheel assemblies 3, 4 and 5, comprises a conventional pneumatic tire casing 8, an inner tube 9, rim 10, wheel 11 and valve stem 12 which connects with the inner tube 9. On the inner crown surface of the inner tube 9 is a layer or film 13 of a finely divided electrically conducting material.

Various electrically conducting powders may be used for this purpose, such as:

Acetylene carbon black
  Electrically conducting carbon black
  Graphite
  Aluminum powder
  Bronze powder Of these powders experiment indicates that acetylene carbon black is preferred because of its small particle size, high conductivity and availability. It is merely necessary to place into the tube a sufficient quantity of the electrically conducting powder so as to provide a film or coating of the finely divided particles over the crown surface of the interior of the tube. The powder may be placed within the tube during its manufacture while the ends of the tube are open, or a slit may be formed in the tube for this purpose and subsequently patched, or, more conveniently, the powder may be inserted in the tube through the valve stem 12. In the latter case the tube is deflated, the valve core removed, the powder inserted, the core replaced, and the tube inflated. The rotation of the tire in ordinary service results in an equal distribution of the powder throughout the tube and particularly the crown portion. The nature of these powders is such that they will cling to the tube surface to form a substantially permanent electrically conducting film throughout the inner surface of the tube.

The amount of conducting material placed within the tube should be sufficient to result in an adequate coating on the inner surface of the tube. This amount will vary according to the size of the tire and the powder used. I have found that for a 6.00-16 tire or tube the quantity of conducting material should be from ½ to 3 cubic inch, with a preferable quantity of 1 cubic inch.

While the conducting material has been described as being particularly applicable to the interior of inner tubes, it is also to be understood that a conducting film 14 may be interposed between the outer surface of the crown portion of the inner tube 9 and the inner surface of the crown portion of the tire casing 8. Also, the powder may be applied to outer crown or tread surface of the tire casing 8. However, it is obvious that the effectiveness of such an application will be temporary in nature and, therefore, the previously described methods of applications are preferable. As above stated the various surfaces may be treated separately or the two or three different surfaces may each be treated collectively with a slight benefit in the combined result.

In the operation of a vehicle embodying my invention the point 15 (Fig. 1) on the tire and tube assembly shows the region in which the highest potential usually occurs. This high potential induces a positive charge on the conducting inner tube nearest the point 15. Insofar as the conducting powder within the inner tube is insulated from other conductors, the total charge of the powder must be zero. This means that an opposite negative charge is induced at other points in the powder. These negative charges are most highly concentrated in the region of point 16 because of the low potential at this point. The effect of the positive charges in the conducting powder is to reduce the potential in the region of point 15, while the effect of the negative charges at point 16 is to increase the potential and the potential gradient at the contact area. The potential gradient tends to drive the negative charges normally formed on the tread surface down into the road, in effect inhibiting the formation of the negative charges which in turn reduces the charge density of the negative charges at point 15. This in turn reduces the amount of static electricity going to and from the car and also reduces the amount of induced charges on the car, thus resulting in the reduction of radio disturbances caused by tires.

From the foregoing description it is believed apparent that I have provided a novel tire assembly in which static shock and radio interference is substantially reduced, and it is to be understood that I contemplate those obvious variations which appear within the spirit of the invention and the scope of the appended claims.

I claim:

1. A static reducing pneumatic tire comprising a tire casing, an inner tube assembled within the casing, and a coating of an electrically conducting acetylene carbon black powder adhered to the surface only of the inner wall of the inner tube around the circumferential crown region thereof.

2. A static reducing pneumatic tire comprising a tire casing, an inner tube assembled within the casing, and a coating of acetylene carbon black adhered to the surface only of the inner wall of the inner tube around the circumferential crown region thereof.

3. In a vehicle, means for reducing static comprising wheel assemblies for supporting the vehicle, at least one of the wheel assemblies comprising a tire casing, an inner tube assembled within the casing, and a coating of an electrically conducting acetylene carbon black powder adhered to the surface only of the inner wall of the inner tube around the circumferential crown region thereof.

4. In a vehicle, means for reducing static comprising wheel assemblies for supporting the vehicle, at least one of the wheel assemblies comprising a tire casing having electrically insulating side wall portions, an inner tube assembled within the casing, and a coating of acetylene carbon black adhered to the surface only of the inner wall of the inner tube around the circumferential crown region thereof.

GERALD L. BENSON.